April 11, 1939. W. R. FREEMAN 2,153,749
COMBINED MASTER CYLINDER AND BRAKE HOLDING MEANS
Filed Oct. 11, 1937
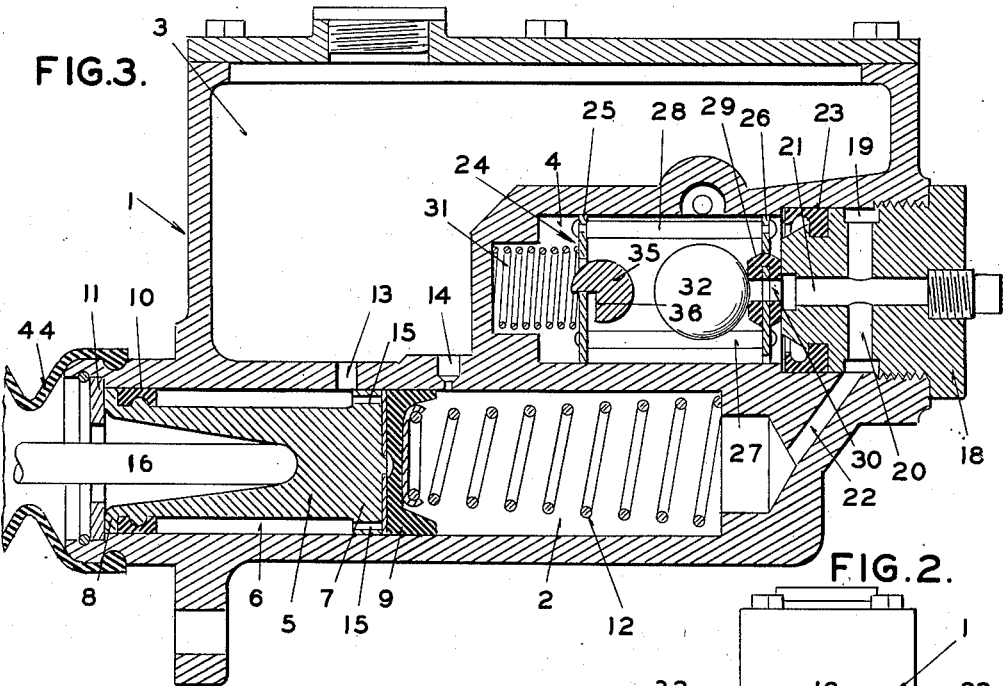
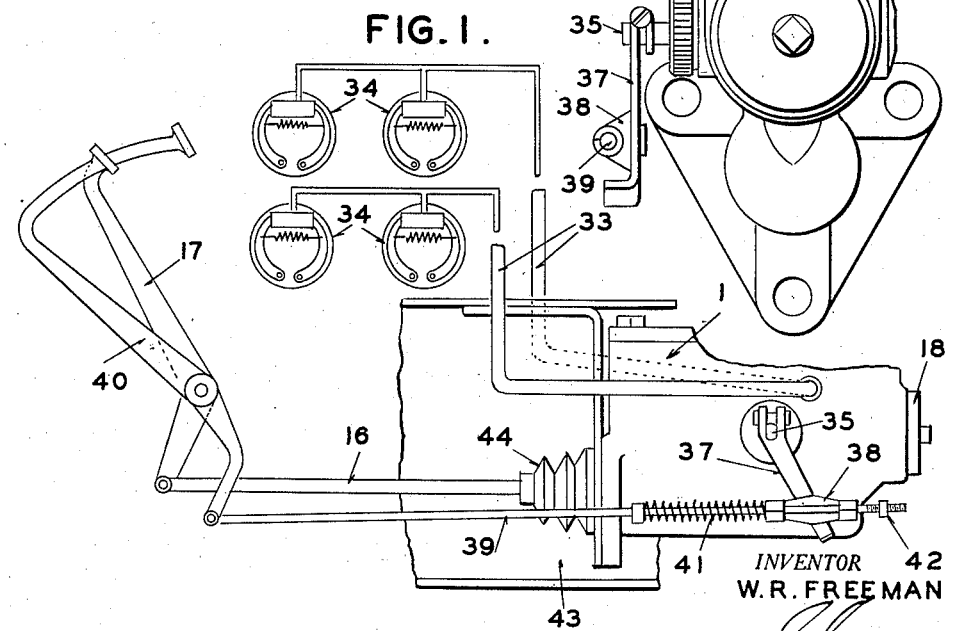
INVENTOR
W. R. FREEMAN
ATTORNEY Patented Apr. 11, 1939

2,153,749

UNITED STATES PATENT OFFICE 2,153,749

COMBINED MASTER CYLINDER AND BRAKE HOLDING MEANS

Walter R. Freeman, University City, Mo., assignor to Wagner Electric Corporation, St. Louis, Mo., a corporation of Delaware Application October 11, 1937, Serial No. 168,310

6 Claims. (Cl. 192—13)

My invention relates to fluid pressure-actuated brakes and more particularly to a combined master cylinder and brake holding means for actuating the brakes and for holding them applied under certain conditions.

One of the objects of my invention is to so construct a master cylinder that a brake holding means may be embodied therein to thus form a unitary construction, thereby decreasing the cost of manufacture and increasing the efficiency of the braking system by eliminating connecting joints previously employed.

Other objects of my invention will become apparent from the following description taken in connection with the accompanying drawing showing a single embodiment thereof. In the drawing Figure 1 is a view of a fluid braking system embodying my invention; Figure 2 is an end view of the combined master cylinder and brake holding means; and Figure 3 is a longitudinal cross-sectional view of the combined master cylinder and brake holding means.

Referring to the drawing in detail, the combined master cylinder and brake holding means is embodied in a single casting 1, the lower portion of which has formed therein a cylinder 2 and the upper portion a reservoir 3. Within the reservoir and above the forward end of the cylinder there is also formed a cylindrical chamber 4 which is open at one end. The cylinder 2 has reciprocably mounted therein a piston 5 formed with an annular recess 6 between the head end 7 and the rear end 8. The head of the piston has cooperating therewith a packing cup 9 and an annular packing member 10 prevents leakage at the rear of the piston. The piston is normally maintained in retracted position against the stop 11 by a spring 12 interposed between the head of the piston and the forward end of the cylinder. The annular recess of the piston is at all times in communication with reservoir 3 by means of the passage 13 and when the piston is in retracted position, the porthole 14 is uncovered which permits communication between the reservoir and the portion of the cylinder ahead of the piston to thus allow for expansion and contraction of the liquid employed in the braking system. The head of the piston is also provided with a series of annular spaced passages 15 which permit fluid to flow from the annular recess through the piston head, past the packing cup, and into the cylinder ahead of the piston only during its retractile stroke, thus preventing any air from being drawn into the system. The piston is reciprocated by means of the piston rod 16 which is connected to the usual brake pedal 17.

The open end of chamber 4 is closed by means of a plug 18 which is provided with an annular groove 19 communicating with a cross-passage 20 and a longitudinally extending passage 21. When the plug is in position, the annular groove 19 communicates directly with a passage 22 in the casting at the forward end of the cylinder, this passageway forming the outlet of the cylinder. It is thus seen that the cylinder communicates with chamber 4 by means of passage 22, the annular groove 19, and passages 20 and 21. The inner end of plug 18 is also provided with an annular packing member 23 to prevent any leakage at the surface of the plug.

The chamber 4 has positioned therein a cage 24 comprising end plates 25 and 26 connected together by two lower rods 27 (one only being shown) and a single upper rod 28. The end plate 26 is apertured and mounted therein is a rubber valve seat 29 having an opening 30 therethrough. The surface of the valve seat on the side adjacent plug 18 is adapted to abut the plug surface surrounding the inner end of passage 21, the valve being maintained in engagement with the plug surface by means of a spring 31 interposed between the closed end of the chamber and the end plate 25 of the cage. The inner surface of the rubber valve seat 29 is adapted to cooperate with a ball 32 mounted to roll upon the two lower rods 27 of the cage which form a track, the ball being free to roll back and forth depending upon the inclination of the vehicle and the action of inertia thereon during change in speed of the vehicle. When the ball is in engagement with valve seat 29 and the valve seat is in engagement with the surface of the plug, passageway 21 will be closed and fluid cannot flow from the chamber to the cylinder but will be free to flow in the opposite direction since the ball will then be forced off the valve seat.

The chamber is provided with outlet conduits 33 upon each side of the chamber, these conduits leading to the well-known braking assemblies 34 of the braking system (shown diagrammatically). Means are also provided to cause the ball valve to be ineffective to prevent fluid from flowing from the chamber and the braking system to the cylinder notwithstanding the action of inertia or the action of gravity on the ball. The means shown comprises a cross-shaft 35 extending through the chamber adjacent the rear end plate 25 of the cage, this cross-shaft being provided with a cam portion 36 for engaging the plate whereby, when the shaft is rotated in a clockwise direction, the cam will engage end plate 25 of the cage and move the cage to the left as viewed in Figure 3, thereby disengaging the valve seat 29 from the surface of the plug. Fluid will now be free to flow in either direction between the chamber and the cylinder.

The shaft 35 may be controlled by any suitable means but I prefer that it be under the control of the clutch mechanism of the vehicle. An arm 37 is fixed to the exterior end of the shaft and the outer end has pivoted thereon a sleeve 38 which receives a rod 39 connected to the clutch pedal 40. The rod 39 is connected to sleeve 38 by means of spring 41, thus permitting the clutch pedal to have relative movement to arm 37 after the arm has been moved to operate the cage, the relative movement resulting from compression of the spring. The end of rod 39 is also provided with an adjustable shoulder 42 for directly engaging the sleeve in order that shaft 35 may be rotated to move the cage to a position where the valve 29 is disengaged from the end surface of the plug. The parts are so arranged that when the clutch is in engaged position, the cage will be in the left-hand position where valve seat 29 is disengaged from the plug, thus permitting free passage of liquid in both directions between the chamber and cylinder. When the clutch is disengaged by depression of the clutch pedal (shown in Figure 1), arm 37 and shaft 35 will be rotated in a counter-clockwise direction, thus permitting spring 31 to move the cage to the right-hand end of the chamber and cause the valve seat 29 to engage the end surface of plug 18 (as shown in Figure 3). Under these conditions the ball will then control the communication between the chamber or brake assemblies and cylinder.

In operation, the cylinder, chamber, and brake system as a whole are filled with a suitable operating liquid as is also the reservoir. The casting is preferably mounted on the support 43 so that the axes of the cylinder and the track of the cage are inclined upwardly toward the front of the vehicle at a very slight angle to the horizontal when the vehicle is on a level roadway. When the clutch is in engaged position, the brakes may be applied and released at will by the operator by proper manipulation of brake pedal 17. By depressing the brake pedal, piston 5 will be moved toward the forward end of the cylinder, thereby cutting off port 14 and applying pressure to the liquid in the system, which pressure is transmitted to the braking assemblies, including the brake shoes. When the brake pedal is released, the piston will be returned to its retracted position by the cylinder spring 12 and also the retracting springs of the brake shoes. The return flow of liquid from the brake assemblies will not be impeded in any way by the ball or valve seat 29, since the cage, due to the engaged condition of the clutch, is at the left hand end of the chamber and the valve seat is away from the end surface of the plug. If piston 5 should return more rapidly than the return flow of liquid from the braking assemblies, liquid will be free to flow from the rear side of the piston head 7 to the portion of the cylinder ahead of the piston, thus overcharging the system and preventing air from being drawn past the piston. After the piston has assumed its retracted position, the excess of liquid in the system is free to return to the reservoir by means of port 14.

If the vehicle should be brought to a stop facing upward on an inclined roadway and the clutch disengaged as is the usual practice, the cage 24 will be moved to the right under the action of spring 31 since the disengaging of the clutch has moved shaft 25 to a position where the spring may move the cage. The position of the cage now is as shown in Figure 3 and valve seat 29 will be engaged with the end surface of plug 18. Ball 32, due to the inclination of the vehicle and also rods 27 forming the track for the ball, will engage the inner surface of the valve seat, thereby closing off passage 21 and preventing any fluid from flowing from the chamber or the brake assemblies to the cylinder. If the brakes have already been applied, they will be maintained in applied position by the action of the ball. If they have not been applied, they may be applied by depressing brake pedal 17 whereby liquid will then be forced from the cylinder into the braking assemblies by the unseating of the ball. The brakes will now be maintained applied without the necessity of maintaining the right foot upon the brake pedal since the ball will prevent any return flow of fluid to the cylinder. The right foot is now free to operate another mechanism, as for example, the accelerator or the starter. The brakes are released by engagement of the clutch, shoulder 42 on rod 39 being so adjusted that the cage will be moved substantially simultaneously with clutch engagement.

When the vehicle is moving along a roadway and the clutch is disengaged and the brakes applied, the brakes will not be maintained in applied position notwithstanding the position of the cage at the right-hand end of the chamber since the ball under these conditions will move away from valve seat 29 due to the action of inertia thereon caused by deceleration of the vehicle.

From the foregoing it is readily seen that I have devised a very simple and compact combined master cylinder and brake holding means by having the latter embodied in a chamber formed integrally with the casting which is employed for the cylinder and reservoir of the master cylinder. The construction permits a considerable amount of space to be conserved and also several joints eliminated which otherwise would be necessary if the brake holding means were a separate unit and connected in the conduit between the end of the cylinder and the braking assemblies. The construction is very easy to assemble and disassemble. The plug 18 need only be unscrewed in order to remove the entire mechanism within chamber 4 in order to make any repair that may be necessary. The assembly and disassembly of the piston construction in cylinder 2 is also unaffected by incorporating the brake holding means within the casting. It is only necessary to remove the dust boot 44 and stop 11 in order to withdraw the piston from the cylinder.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. A combined master cylinder and holding means for fluid-actuated brakes of a vehicle comprising a single casting provided with a cylinder, a reservoir above the cylinder and a chamber positioned in said reservoir, a piston reciprocable in the cylinder, means forming a passage between the cylinder and the chamber, means forming an outlet from the chamber, and valve means in said chamber for preventing fluid from flowing from said chamber to the cylinder but not in the opposite direction, and means operable from the exterior of the chamber for causing said valve means to be ineffective.

2. A combined master cylinder and holding means for fluid-actuated brakes comprising a cylinder, a piston reciprocable therein, a reservoir above the cylinder and communicating with the cylinder ahead of the piston when the latter is in retracted position, a chamber within the reservoir, said cylinder, reservoir and chamber being formed of integral material, means forming a passage between the cylinder and the chamber, means forming an outlet for said chamber, valve means comprising a rolling ball in said chamber for preventing fluid from flowing from said chamber to the cylinder but not in the opposite direction, and means operable from the exterior of the chamber for causing said valve means to be ineffective.

3. A combined master cylinder and holding means for fluid-actuated brakes of a vehicle comprising a single casting provided with a cylinder, a reservoir above the cylinder and a chamber positioned in said reservoir and open at one end, a closure plug for said open end of the chamber, a piston reciprocable in the cylinder, means including a passage in the plug for placing the cylinder in communication with the chamber, means forming an outlet from the chamber, valve means in said chamber and cooperating with the plug passage for preventing fluid from flowing from said chamber to the cylinder but not in the opposite direction, and means operable from the exterior of the chamber for causing said ball to be inoperative.

4. A combined master cylinder and holding means for fluid-actuated brakes of a vehicle comprising a single casting provided with a cylinder, a reservoir above the cylinder and a chamber positioned in said reservoir and open at one end, a closure plug for said open end of the chamber, a piston reciprocable in the cylinder, means including a passage in the plug for placing the cylinder in communication with the chamber, means forming an outlet from the chamber, a movable cage in said chamber and provided with an annular valve seat cooperating with the passage in the plug, a rolling ball in said cage and adapted to engage the annular valve seat when the vehicle is facing upward on an inclined roadway, and means operable from the exterior of the chamber for moving said cage to a position where the annular valve seat does not cooperate with the passage.

5. A master cylinder unit for fluid-actuated braking apparatus which comprises a single casting provided with a cylinder for receiving a brake applying piston, with a fluid reservoir and with a chamber for containing a brake holding valve, said casting being provided with passages for placing the cylinder in communication with said last named chamber and with the reservoir and with the braking apparatus, means comprising a valve in said chamber for preventing fluid from returning from the braking apparatus to the cylinder but not preventing the piston when actuated from causing fluid under pressure to flow toward the braking apparatus, and means operable from the exterior of the chamber for causing said valve means to be ineffective.

6. A master cylinder unit for fluid-actuated braking apparatus which comprises a single casting provided with a cylinder for receiving a brake applying piston, with a fluid reservoir above the cylinder and with a chamber above the cylinder for containing a brake holding valve and positioned within the outlines of the reservoir, said casting being provided with passages for placing the cylinder in communication with said last named chamber and with the reservoir and with the braking apparatus, valve-controlled means comprising a rolling ball in said chamber for preventing fluid from returning from the braking apparatus to the cylinder but not preventing the piston when actuated from causing fluid under pressure to flow toward the braking apparatus, and means operable from the exterior of the chamber for causing said valve means to be ineffective.

WALTER R. FREEMAN.